(12) United States Patent
Sun et al.

(10) Patent No.: US 8,787,189 B2
(45) Date of Patent: Jul. 22, 2014

(54) FEEDBACK METHOD AND SYSTEM OF CHANNEL QUALITY INDICATIOR

(75) Inventors: Yunfeng Sun, Guangdong Province (CN); Jing Jiang, Guangdong Province (CN); Changqing Zhu, Guangdong Province (CN); Junfeng Zhang, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 367 days.

(21) Appl. No.: 13/257,790

(22) PCT Filed: Dec. 28, 2009

(86) PCT No.: PCT/CN2009/076152
§ 371 (c)(1),
(2), (4) Date: Nov. 15, 2011

(87) PCT Pub. No.: WO2010/105486
PCT Pub. Date: Sep. 23, 2010

(65) Prior Publication Data
US 2012/0051250 A1   Mar. 1, 2012

(30) Foreign Application Priority Data
Mar. 20, 2009   (CN) .......................... 2009 1 0080376

(51) Int. Cl.
*H04L 12/26* (2006.01)
*H04L 12/24* (2006.01)
*H04W 24/10* (2009.01)

(52) U.S. Cl.
CPC ........... *H04L 41/5032* (2013.01); *H04W 24/10* (2013.01)
USPC .......................................... 370/252; 370/241

(58) Field of Classification Search
USPC ................................................... 370/241, 252
See application file for complete search history.

(56) References Cited

U.S. PATENT DOCUMENTS

2007/0220151 A1* 9/2007  Li et al. .......................... 709/226
2009/0154588 A1* 6/2009  Chen et al. ..................... 375/267
2009/0199055 A1* 8/2009  Chen et al. ..................... 714/701

(Continued)

FOREIGN PATENT DOCUMENTS

CN           1531238 A        9/2004
CN        101056156 A       10/2007

(Continued)

OTHER PUBLICATIONS

International Search Report for PCT/CN2009/076152 dated Feb. 25, 2010.

*Primary Examiner* — Kenny Lin
(74) *Attorney, Agent, or Firm* — Banner & Witcoff, Ltd.

(57) ABSTRACT

A method of CQI feedback comprises: in a CoMP system, a terminal feeding back a CQI corresponding to a comprehensive channel formed between the terminal and all transmission nodes in a CATS or each CQI corresponding to each channel between the terminal and each transmission node. A system of CQI feedback; in the system is also disclosed, a feedback unit at the terminal side is used in the CoMP system to calculate and feed back the CQI corresponding to the comprehensive channel formed between the terminal and all the transmission nodes in the CATS or each CQI corresponding to each channel between the terminal and each transmission node. With the method and system of the present invention, not only the CQI feedback in the CoMP system can be realized, but also the difference between the CQI feedback in the control channel and that in the traffic channel can be avoided.

17 Claims, 2 Drawing Sheets

(56) References Cited

U.S. PATENT DOCUMENTS

| | | | |
|---|---|---|---|
| 2009/0316807 A1* | 12/2009 | Kim et al. | 375/260 |
| 2010/0232336 A1* | 9/2010 | Choudhury et al. | 370/312 |
| 2010/0238984 A1* | 9/2010 | Sayana et al. | 375/219 |
| 2011/0230224 A1* | 9/2011 | Larsson et al. | 455/513 |
| 2011/0268208 A1* | 11/2011 | Larsson et al. | 375/267 |
| 2011/0280284 A1* | 11/2011 | Nakao et al. | 375/140 |
| 2011/0310786 A1* | 12/2011 | Qin et al. | 370/312 |

FOREIGN PATENT DOCUMENTS

| | | |
|---|---|---|
| CN | 101388703 A | 3/2009 |
| WO | 2008147121 A1 | 12/2008 |

* cited by examiner

FEEDBACK METHOD AND SYSTEM OF CHANNEL QUALITY INDICATIOR

TECHNICAL FIELD

The present invention relates to the channel quality indicator (CQI) feedback technology, and particularly, to a method and system of CQI feedback in a coordinated multi-point transmission and reception (CoMP) system.

BACKGROUND OF THE RELATED ART

Along with the demand for LTE-A, more and more attention is paid on the cell average frequency spectrum efficiency and the cell edge frequency spectrum efficiency. By comparison, more attention is paid on the cell edge frequency spectrum efficiency, mainly because the uplink and downlink of the LTE-A system are frequency division systems which take orthogonal frequency division multiplexing (OFDM) as basic multiple access multiplexing. The difference between the frequency division system and the traditional wireless communication system which takes code division multiple access (CDMA) as the basic multiple access multiplexing is that, the LTE-A system has no processing gain and there is almost no interference problem within the cell because of the full orthogonal frequency-division, but interference processing at the cell edge is relatively difficult.

In order to effectively solve the problem of the interference processing at the cell edge, CoMP technology is introduced. The CoMP technology is: transmitting in coordination by using transmitting antennas of multi-cell to achieve relatively high capacity and reliable transmission of wireless links at the cell edge. FIG. 1 illustrates a basic schematic diagram of a CoMP, comprising: a base station 21, a base station 22 and a base station 23; a cell 11 in which the base station 21 is located, a cell 12 in which the base station 22 is located, and a cell 13 in which the base station 23 is located; a user equipment (UE) 31, a UE 32 and a UE33. In FIG. 1, the cell 11, the cell 12 and the cell 13 provide services in coordination for the UE 32 by using the CoMP technology.

In order to clarify the related concepts of the CoMP, the related concepts of a CoMP domain and a CoMP active set are defined on the 56$^{th}$ 3GPP meeting. Cell entity for measuring and/or reporting by the UE (CoMP Reporting Cell Set, CRCS) includes three aspects of content as follows: first, the CRCS is centrally determined by the network and notified by the serving cell to the UE; second, the case that the UE can coordinate the determination of the CRCS is not excluded; and third, the CRCS is semi-statically configured. Among them, the CoMP active transmission point set (CATS) practically serving the users also contains three aspects of content as follows: first, the CATS is determined by the network, and it might be different for different UEs; second, the UE can know or not know the CATS; and third, the CATS is dynamically configured or semi-statically configured.

In the CoMP research path formed in the 3GPP 55bis meeting, the corresponding channel quality is only the channel quality between the UE and the primary serving cell when demodulating the control information carried in a control channel on the UE, due to it is pointed that interaction is performed only between the UE and a single cell, i.e., the primary serving cell, for the above-mentioned control channel, such as physical downlink control channel (PDCCH), physical control format indicator channel (PCFICH), physical hybrid ARQ indicator channel (PHICH), physical broadcast channel (PBCH), or primary/secondary synchronization channel (P/SCH); however, for a traffic channel, such as physical downlink share channel (PDSCH), paging channel (PCH), or dedicated broadcast channel (DBCH), the corresponding channel quality is a comprehensive channel quality formed by all cells in the CATS when demodulating the traffic data bore in the above-mentioned traffic channel. Therefore, in CoMP feedback, it needs to consider the difference between the CQI feedback in the control channel and the CQI feedback in the traffic channel.

FIG. 2 illustrates a schematic diagram of transmission nodes of control information and traffic data in CoMP multi-point joint transmission, comprising: a UE1; a base station 1, a base station 2, and a base station 3; cell 1 in which the base station 1 is located, cell 2 in which the base station 2 is located, and cell 3 in which the base station 3 is located; pilot 1 transmitted by the base station 1, pilot 2 transmitted by the base station 2, and pilot 3 transmitted by the base station 3; a first weight w1, a second weight w2, and a third weight w3. In CoMP multi-point joint transmission, control information 1 of the UE1 is sent from the primary serving cell, i.e., the cell 1, to the UE1, that is, interaction is performed only between the primary serving cell and the UE for the control channel. A formula of the corresponding received signal is: $Y_c = H_1 S_c + N_1$; wherein, $S_c$ denotes the control information of the control channel, $H_1$ denotes the channel quality between the cell 1 and the UE1, and $N_1$ denotes the received noise and interference. Traffic data, i.e., the traffic data 1, traffic data 2 and traffic data 3, in the same sub-frame are sent by all cells, i.e., cell 1, cell 2 and cell 3, in the CATS to the UE1, that is, for the traffic channel interaction is performed between the UE and all cells including the primary serving cell. A formula of the corresponding received signal can be: $Y_d = (H_1 W_1 + H_2 W_2 + H_3 W_3) S_d + N$; wherein, $S_d$ denotes the traffic data of the traffic channel, $H_1$ still denotes the channel quality between the cell 1 and the UE1, $H_2$ denotes the channel quality between the cell 2 and the UE1, $H_3$ denotes the channel quality between the cell 3 and the UE1, and N denotes the received comprehensive noise and interference.

In summary, on the one hand, from the perspective of channel characteristic, the corresponding channel characteristic of the control channel is $H_1$, and the corresponding channel characteristic of the traffic channel is the comprehensive channel $(H_1 W_1 + H_2 W_2 + H_3 W_3)$ formed by all cells in the CATS. On the other hand, from the perspective of interference signal, for the control channel, since the control channel only interact with the primary serving cell, and the same resource in the adjacent cell might also transmit other control information besides of the control information interacting with the primary serving cell, there is interference to the control information transmitted between the primary serving cell and the control channel; and for the traffic channel, the same resource transmits the same data, it can be seen from the above that the interference signal in the control channel is stronger than that in the traffic channel.

Combining of the above-mentioned factors, it will lead to a greater difference between the channel quality of the control channel and the channel quality of the traffic channel. However, CQI feedback in the prior art only relates to one cell to provide services for the UE, due to it does not involve the introduced CoMP technology, thus there is no problem on the difference of the CQI feedback. In other words, for the CQI feedback with the introduced CoMP technology, there is not a solution on the CQI feedback yet, let alone a solution to avoid the difference of the CQI feedback after introducing the CoMP technology.

CONTENT OF THE INVENTION

In view of this, the main purpose of the present invention is to provide a method and system of CQI feedback, the method and system can not only achieve the CQI feedback in the CoMP system, but also avoid the difference of the CQI feedback between the control channel and the traffic channel.

To achieve the above-mentioned purpose, the technical scheme of the present invention is implemented as follows.

A method of channel quality indicator feedback comprises: in a multi-point coordinated transmission and reception (CoMP) system, a terminal feeding back a CQI corresponding to a comprehensive channel formed between the terminal and all transmission nodes in a CATS, or each CQI corresponding to each channel between each transmission node and the terminal.

Wherein the type of the transmission node comprises a primary node; and said feedback further comprises: the terminal feeding back a CQI corresponding to a channel between the primary node and the terminal to the primary node; and the terminal feeding back the CQI corresponding to the comprehensive channel to the primary node, or the terminal feeding back to the primary node each CQI of each channel between the terminal and each non-primary node except the primary node in the CATS.

Wherein, the level of each CQI is different from or the same as the level of the CQI corresponding to the comprehensive channel.

Wherein, the feedback further comprises: the terminal feeding back according to different feedback methods;

wherein, the feedback methods comprise: full bandwidth feedback, feedback of high level configuring sub-bands or feedback of the terminal selecting sub-bands; and after the feedback, the method further comprises a determining process of modulation and encoding, and the determining process of the modulation and encoding comprises: corresponding to the different feedback methods, the primary node performing resource scheduling according to the CQI based on the full bandwidth or different sub-band and fed back by the terminal, and selecting a matching modulation and encoding method to modulate and encode data of scheduled users.

Wherein, when the feedback method is the feedback of the high level configuring the sub-bands, or the feedback of the terminal selecting the sub-bands, the feedback further is: the terminal applying a differential mode to feed back; and wherein, the differential mode is: differentiating the CQI based on the different sub-band with the CQI based on the full bandwidth.

Wherein, the feedback comprises: periodic feedback or aperiodic feedback; and when the periodic feedback and aperiodic feedback happen in a same sub-frame, said terminal reports the aperiodic feedback in said sub-frame.

Wherein, the method further comprises: in the CATS, different transmission nodes applying the same modulation and encoding method.

A system of channel quality indicator feedback, comprises a feedback unit at a terminal side, and a modulation and encoding determination unit at a primary node side; wherein, said feedback unit is used in a CoMP system to calculate and feed back a CQI corresponding to a comprehensive channel formed between the terminal and all transmission nodes in a CATS, or each CQI corresponding to each channel between each transmission node and the terminal; and said modulation and encoding determination unit is used to determine a modulation and encoding method corresponding to downlink data transmission according to content fed back by the terminal.

Wherein, the feedback unit is further used to feed back a CQI corresponding to a channel between the primary node and the terminal to the primary node; and feed back the CQI corresponding to the comprehensive channel to the primary node, or respectively feed back to the primary node each CQI of each channel formed between each non-primary node except the primary node in the CoMP active transmission point set and the terminal.

Wherein, the feedback unit is further used to feed back according to different feedback methods; and wherein, said feedback methods comprise: full bandwidth feedback, feedback of high level configuring sub-bands or feedback of the terminal selecting sub-bands.

Wherein, the feedback unit is further used to perform periodic feedback or aperiodic feedback; and when the periodic feedback and the aperiodic feedback happen in a same sub-frame, the terminal reports the aperiodic feedback to said sub-frame.

Wherein, the modulation and encoding unit is further used to, corresponding to the different feedback methods, perform resource scheduling according to the CQI based on the full bandwidth or different sub-band and fed back by the terminal, and select a matching modulation and encoding method to modulate and encode.

In the CoMP system of the present invention, the UE feeds back the CQI corresponding to the comprehensive channel formed between the UE and all transmission nodes in the CATS or each CQI corresponding to the channel between each transmission node itself and the UE. Since the fed back CQI is the comprehensive CQI reflecting the situation of the comprehensive channel, or each corresponding CQI reflecting the situation of different channel, reduce the difference of the CQI fed back respectively in the control channel and in the traffic channel.

With the present invention, the difference of the CQI fed back respectively in the control channel and in the traffic channel is reduced. Furthermore, the technical scheme of respectively feeding back the CQI corresponding to the channel between the primary node and the UE and the CQI corresponding to the comprehensive channel formed between all transmission nodes in the CATS and the UE to the transmission node whose type is the primary node in the CATS, not only can solve the difference problem of the CQI feedback in the control channel and in the traffic channel in the CoMP system, but also can let the primary node acquire a clear channel quality information between the primary node and the UE as soon as possible when the CoMP user changes to the non-CoMP user. Thus, the UE can respectively acquire the CQI feedbacks in the control channel and the traffic channel. Thereby, when encoding and modulating the traffic channel and the control channel, the traffic channel and the control channel respectively can select a suitable encoding method and modulation method according to their own CQI value, which will benefit to not only the encoding and modulation of the traffic channel and the control channel, but also accommodate the scenario of fast cell selection. It should be noted that: the UE mentioned in the present invention is the CoMP user terminal in the CoMP system; and to simplify the description, the CoMP user terminal is simplified as UE in the following description.

PREFERRED EMBODIMENTS OF THE
PRESENT INVENTION

The basic idea of the present invention is that: in the CoMP system, the UE feeds back the CQI corresponding to the comprehensive channel formed between the UE and all transmission nodes in the CATS, or each CQI corresponding to the channel between the UE and each transmission node itself.

The implementation of the technical scheme is further described in detail with combination of the accompanying drawings.

One method of CQI feedback comprises: in the CoMP system, the UE feeding back the CQI corresponding to the comprehensive channel formed between the UE and all transmission nodes in the CATS, or each CQI corresponding to the channel between the UE and each transmission node itself.

Here, the method further comprises: in the CATS, different transmission nodes apply the same modulation and coding scheme (MCS).

Figure 1:
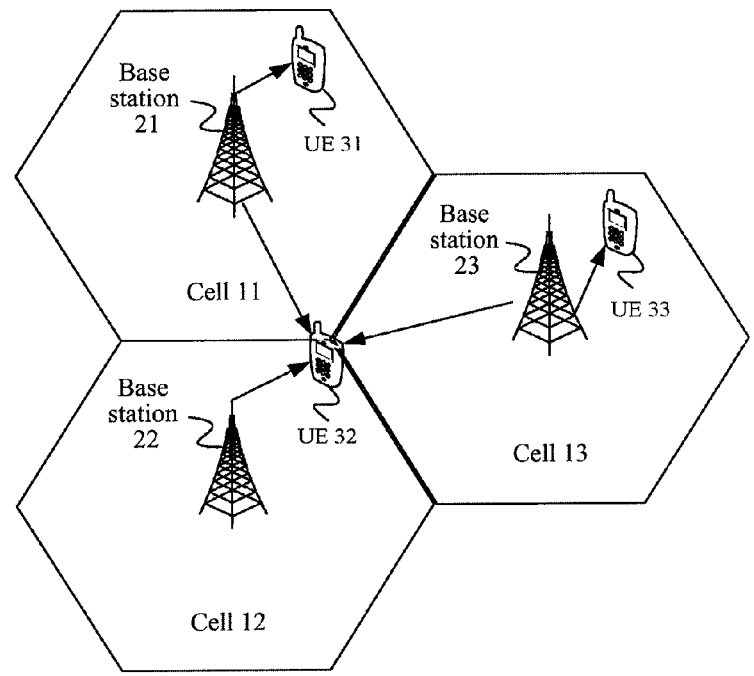
FIG. 1 is a basic schematic diagram of a CoMP.
Figure 2:
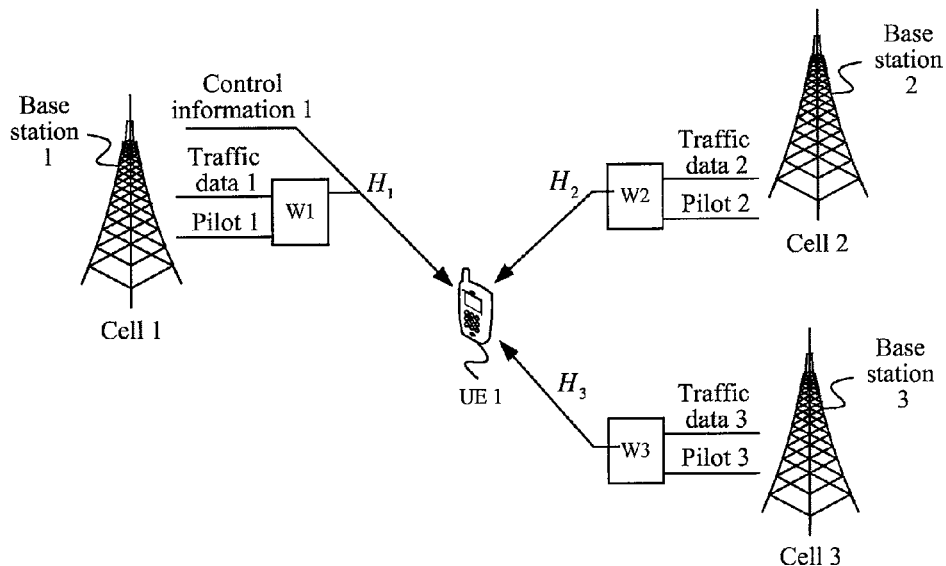
FIG. 2 is a schematic diagram of transmission nodes of control information and traffic data in CoMP multi-point joint transmission.
Figure 3:
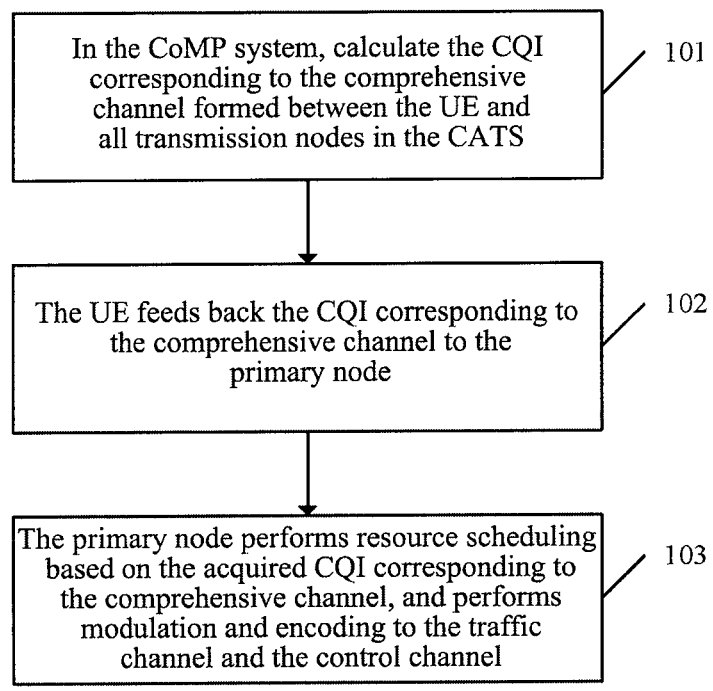
FIG. 3 is a flow chart of implementing a method embodiment of the present invention.

Here, in the CATS, the type of transmission nodes comprises a primary node and a non-primary node. Before the feedback, a comprehensive CQI can be calculated; and after the feedback, the primary node can perform resource scheduling based on the acquired comprehensive CQI, and perform modulation and encoding to the traffic channel and the control channel. Specifically, as shown in FIG. 3, a method of CQI feedback comprises the following steps:

step 101, in the CoMP system, calculating the CQI corresponding to the comprehensive channel formed between the UE and all the transmission nodes in the CATS;

step 102, the UE feeding back the CQI corresponding to the comprehensive channel to the primary node; and step 103, the primary node performing resource scheduling based on the acquired CQI corresponding to the comprehensive channel, and performing modulation and encoding to the traffic channel and the control channel.

For the technical scheme constructed by steps 101~103, since the CQI fed back in step 102 is the CQI corresponding to the comprehensive channel, it reduces the difference between the CQI fed back in the control channel and the CQI fed back in the traffic channel. However, to more reduce the difference between the CQI fed back in the control channel and the CQI fed back in the traffic channel and make it easy for the current UE being the CoMP user terminal to switch to the non-CoMP transmission mode on the basis of feeding back the CQI corresponding to the comprehensive channel, in the present invention the CQI corresponding to the traffic channel and the CQI corresponding to the control channel fed back to the primary node respectively, and the step 102 further comprises the following three cases.

In the first case, the primary node receives the comprehensive CQI, corrects the CQI corresponding to the comprehensive channel by adopting a correction factor, and acquires the corrected CQI, wherein the corrected CQI can be the CQI of the control channel; and the UE feeds back the CQI corresponding to the comprehensive channel to the primary node, wherein the CQI corresponding to the comprehensive channel is the CQI of the traffic channel. In the second case, the UE feeds back the CQI corresponding to the channel between the primary node and the UE to the primary node, wherein the CQI is used to indicate the channel quality between the primary node and the UE and can be the CQI of the control channel; and the UE feeds back the CQI corresponding to the comprehensive channel formed between the UE and all transmission nodes in the CATS to the primary node, wherein the CQI corresponding to the comprehensive channel is used to indicate the channel quality of the traffic channel and can be the CQI of the traffic channel; here, the level of the CQI might be different from or the same as the CQI corresponding to the comprehensive channel. In the third case, the UE feeds back the CQI corresponding to the channel between the primary node and the UE to the primary node, wherein the CQI is used to indicate the channel quality between the primary node and the UE and can be the CQI of the control channel; and the UE respectively feeds back each CQI of the channel formed between the terminal and each non-primary node itself in the CATS to the primary node, wherein each CQI respectively indicates the channel quality between each non-primary node and the UE, meanwhile, each CQI, with the CQI corresponding to the channel between the primary node and the UE, commonly reflects the channel quality of the traffic channel.

It should be noted that both the second and third cases feed back the CQI corresponding to the channel between the primary node and the UE separately. Besides of reducing the difference of the CQI feedback, an additional advantage is that the primary node can acquire the CQI corresponding to the channel between the primary node and the UE as soon as possible after the current UE being the CoMP user terminal switches to the non-coordinated scenario, and that advantage is more evident in the fast cell switching.

The processing of step 101 is specifically that: before the feedback, calculate the CQI corresponding to the comprehensive channel formed between the UE and all transmission nodes in the CATS, the CQI corresponding to the channel between the primary node and the UE, or each CQI of the channel formed between the UE and each non-primary node itself except the primary node in the CATS; the calculation method adopted can be the calculation according to different designing methods for measurement pilots or transmission modes.

For the designing methods for measurement pilots, take calculating the comprehensive CQI for example, when the measurement pilots of the cells in which the transmission nodes are respectively located are the same, the synthesized channel information of the comprehensive channel can be directly measured and acquired, and further the CQI corresponding to the comprehensive channel is acquired by using the method defined in the existing 3GPP LTE 36.213; if the measurement pilots of the cells in which the transmission nodes are respectively located are different, such as orthogonal with each other, respectively estimate the channel from each transmission node in the CATS to the UE, and combine the channels to acquire the synthesized channel information, and further acquire the CQI corresponding to the comprehensive channel by using the method defined in the existing 3GGP LTE 36.213. For the transmission modes, the transmission modes can be the transmission mode of the control channel, the transmission mode of the traffic channel, or the transmission mode, adopting during the CoMP, of the comprehensive channel formed between the UE and the all transmission nodes participating the CoMP in the CATS.

Wherein, the comprehensive channel is the equivalent channel $(H_1W_1+H_2W_2+\ldots+H_kW_k)$ formed between the UE and all transmission nodes (acquired at the UE side) participating the coordination in the CATS; wherein, when the UE does not know the sender's beam weight and accurate channel information, all these information can be estimated and acquired with the existing estimation method, at this time, the above expressions is changed to $\tilde{H}_1\tilde{W}_1+\tilde{H}_2\tilde{W}_2+\ldots+\tilde{H}_k\tilde{W}_k$.

H₁, H₂, ..., H_k are the channel information between different transmission node and the UE, here, k denotes the number of the transmission nodes participating the coordination; and the CQI information is calculated with the method in the prior art and according to the comprehensive channel information.

Here, the feedback in step 102 comprises: periodic feedback and aperiodic feedback; and when the periodic feedback and the aperiodic feedback happen in the same sub-frame, the UE only reports the aperiodic feedback in that sub-frame.

Here, the feedback in step 102 specifically is that: the UE feeds back according to different feedback methods; and the different feedback methods comprise: full bandwidth feedback, feedback of the high level configuring the sub-band or feedback of the UE selecting the sub-band. The specific process of step 103 is as follows: modulating and encoding after the feedback, and corresponding to different feedback methods, the specific modulation and encoding process is that: the primary node performs resource scheduling according to the CQI based on the full bandwidth or different sub-band and fed back by the UE, and selects a matching modulation and encoding method for modulation and encoding.

With the full bandwidth feedback, according to the adopted transmission method, the UE calculates the CQI according to the channel quality of the whole bandwidth; with the feedback of high level configuring the sub-band, the high level indicates the UE feeds back in which sub-band, meanwhile, the UE also needs to feed back the CQI based on the full bandwidth besides of feeding back the CQI in the corresponding sub-band; with the feedback of the UE selecting the sub-band, the UE separately selects several best or worst sub-bands to feed back the CQI, in this method, it also needs the CQI based on the full bandwidth.

Moreover, when the feedback method is the feedback of the high level configuring the sub-band, or the feedback of the UE selecting the sub-band, the feedback in step 102 further is that: the UE feeds back with a differential mode; and the differential mode is: differentiating the CQI based on different sub-bands with the CQI based on the full bandwidth. Wherein, the feedback of the CQIs based on the full bandwidth and based on the sub-band is: feeding back according to each code word flow; so that, when differentiating the CQI based on different sub-bands with the CQI based on the full bandwidth, differentiate with the CQI based on the full bandwidth in the corresponding code word flow.

Specifically, in the present invention, during the feedback, one normal mode is: feeding back the first type of CQI and the second type of CQI respectively to the primary node with the format defined in the existing 3GPP LTE 36.213, wherein, the first type of CQI is the CQI corresponding to the channel between the primary node and the UE, and the second type of CQI is the CQI corresponding to the comprehensive channel formed between the UE and all transmission nodes in the CATS, or is each CQI of the channel formed between the UE and each non-primary node itself except the primary node in the CATS; and another special mode is: after applying the differential mode, feeding back one type of CQI in the first type of CQI and the second type of CQI which reflects the channel quality of the traffic channel to the primary node with the format defined in the existing 3GPP LTE 36.213, differentiating the other type of CQI in the first type of CQI and the second type of CQI which reflects the channel quality of the traffic channel with the one type of CQI, and then feeding back the other type of CQI, and especially when the one type of CQI comprises the CQI based on the full bandwidth, differentiating the other type of CQI in the first type of CQI and the second type of CQI with the CQI based on the full bandwidth in the one type of CQI, and then feeding back it to the primary node. When applying the latter special mode, that is, when applying the differential mode to feed back, the feedback overhead can be largely reduced.

Specifically, take the second case for example, if the CQI corresponding to the channel between the primary node and the UE is noted as CQI-A, and the CQI corresponding to the comprehensive channel formed between the UE and all transmission nodes in the CATS is noted as CQI-B, then besides of using the format defined in the existing 3GPP LTE 36.213 to feed back the CQI-A and CQI-B to the primary node, differential mode can also be used to feed back, for example, in order to reduce the feedback overhead, CQI-A can be taken as a reference, and differentiate the CQI-B with the CQI-A. In particular, when the CQI-A contains the CQI based on the full bandwidth, the CQI-B is differentiated with the CQI based on the full bandwidth in the CQI-A, and the CQI-A and the differential CQI-B are fed back to the primary node; preferably, when the CQI-B contains the CQI based on the full bandwidth, the CQI-A is differentiate with the CQI based on the full bandwidth in the CQI-B, and the CQI-B and the differential CQI-A are fed back to the primary node. Take the third case for example, if applying the differential mode to feed back, the CQI-A can still be taken as a reference, each CQI of the channel formed between the UE and each non-primary node itself (except the primary node) in the CATS is differentiated with the CQI-A. In particular, when the CQI-A contains the CQI based on the full bandwidth, the each CQI is differentiated with the CQI based on the full bandwidth in the CQI-A, the CQI-A and each differential CQI are fed back to the primary node.

The first method embodiment is the specific implementation process of one example in the first case above-mentioned. Here, the cell in which the primary node is located is called as the primary serving cell, and the cells in which the non-primary nodes are located are called as non-primary serving cells. Both the primary serving cell and the non-primary serving cells are the coordinated cells in the CATS, and both the primary node and the non-primary nodes are the transmission nodes in the CATS. The control channels involved in the present embodiment comprise: PDCCH, PCFICH, PHICH, PBCH, or P/SCH, and so on; and the traffic channels comprise: PDSCH, PCH or DBCH, and so on.

In the present method embodiment, the UE estimates the comprehensive channel formed between the UE and all coordinated cells participating in the joint transmission in the CATS; according to the transmission mode used in the joint transmission, calculates the CQI of the comprehensive channel; and feeds back the CQI to the primary serving cell in accordance with the mode defined in 3GPP LTE 36.213. The primary serving cell corrects the fed back CQI with a correction factor and then acquires the CQI of the control channel. The value range of the correction factor is 0<β<1, and when only one primary node is included in the CATS, β=1.

It is worthy to note that, the CQI feedback can be a periodic feedback or an aperiodic feedback, differential level used in the differential feedback can refer to a CQI offset level table under different overhead demands currently defined in the 3GPP LTE 36.213. For example, Table 1 gives the table of the CQI values corresponding to different differential offset levels at the 3 bit differential CQI feedback overhead defined in the LTE, and the differential offset level table can also be newly defined based on feedback overhead.

TABLE 1

| Spatial differential CQI value | Offset level |
|---|---|
| 0 | 0 |
| 1 | 1 |
| 2 | 2 |
| 3 | ≥3 |
| 4 | ≤−4 |
| 5 | −3 |
| 6 | −2 |
| 7 | −1 |

The second method embodiment is the specific implementation process of one example in the second case above-mentioned. Here, the cell in which the primary node is located is called as the primary serving cell, and the cells in which the non-primary nodes are located are called as non-primary serving cells. Both the primary serving cell and the non-primary serving cells are the coordinated cells in the CATS, and both the primary node and the non-primary nodes are the transmission nodes in the CATS. The control channels involved in the present embodiment comprise: PDCCH, PCFICH, PHICH, PBCH, or P/SCH, and so on; and the traffic channels comprise: PDSCH, PCH or DBCH, and so on.

In the present method embodiment, the UE calculates the channel quality of the channel between the primary serving cell and the UE and the channel quality of the comprehensive channel between the UE and all coordinated cells in the CATS respectively, and respectively calculates the corresponding CQI values. When calculating the channel quality of the channel between the primary serving cell and the UE, the UE can estimate and acquire the CQI value, noted as CQI-A, according to the channel estimation result of the measurement pilot of the control channel. When the UE estimates the channel quality of the comprehensive channel, depending on different design methods of the measurement pilot, the UE can estimate the channel from each transmission node in the CATS to the UE respectively, and then combine to get the synthesized channel information, and further to acquire the CQI of the comprehensive channel; or can directly measure to get the synthesized channel information of the comprehensive channel, and further to acquire the CQI of the comprehensive channel; wherein, the CQI value of the comprehensive channel is noted as CQI-B. The method for calculating the CQI value can be the method defined in the 3GPP LTE 36.213.

The information fed back in the CQI-A and the CQI-B comprises the CQI information of the full bandwidth calculated based on the full bandwidth, and can also comprise the CQI information of each sub-band in part of or all of the sub-bands. When selecting part of the sub-bands, the selected sub-bands can be the sub-bands configured by using the feedback of the high level configuring the sub-bands, or can be the sub-bands selected by using the feedback of the UE selecting the sub-bands. Preferably, the calculation on the CQI-A is to calculate based on the transmission mode of the control channel. Preferably, the calculation on the CQI-B is to calculate based on the transmission mode of the traffic channel.

Finally, the UE feeds back the two types of CQI information including the CQI of the control channel and the CQI of the traffic channel, which are obtained by calculating, to the primary serving node. During the feedback, two modes can be applied to feed back the CQI-A and the CQI-B. The first one is the normal mode, that is, both the CQI-A and the CQI-B can be directly fed back to the primary serving cell by using the method defined in the 3GPP LTE 36.213. The second one is the special mode, that is, in order to reduce the feedback overhead, use the differential mode to feed back. For the differential mode to feed back, it comprises the following two cases.

In the first case, the CQI-A is fed back by using the feedback method defined in the 3GPP LTE 36.213. The CQI-B is differentiated with the CQI-A, wherein, when the fed back CQI-A comprises the CQI based on the full bandwidth, preferably the CQI-B is differentiated with the CQI based on the full bandwidth in the CQI-A. Herein, the calculation equation is:

the differential CQI offset level of the CQI-B based on the full bandwidth=the index of the CQI-B based on the full bandwidth−the index of the CQI-A based on the full bandwidth; and the differential CQI offset level of the CQI-B based on the sub-band=the index of the CQI-B based on the sub-band−the index of the CQI-A based on the full bandwidth.

In the second case, the CQI-B is fed back by using the feedback method defined in the 3GPP LTE 36.213. The CQI-A is differentiated with the CQI-B, wherein, when the fed back CQI-B comprises the CQI based on the full bandwidth, preferably the CQI-A is differentiated with the CQI based on the full bandwidth in the CQI-B. Herein, the calculation equation is:

the differential CQI offset level of the CQI-A based on the full bandwidth=the index of the CQI-A based on the full bandwidth−the index of the CQI-B based on the full bandwidth; and the differential CQI offset level of the CQI-A based on the sub-band=the index of the CQI-A based on the sub-band−the index of the CQI-B based on the full bandwidth.

The third method embodiment is the specific implementation process of one example in the third case above-mentioned. Here, the cell in which the primary node is located is called as the primary serving cell, and the cells in which the non-primary nodes are located are called as non-primary serving cells. Both the primary serving cell and the non-primary serving cells are the coordinated cells in the CATS, and both the primary node and the non-primary nodes are the transmission nodes in the CATS. The control channels involved in the present embodiment comprise: PDCCH, PCFICH, PHICH, PBCH, or P/SCH, and so on; the traffic channels comprise: PDSCH, PCH or DBCH, and so on.

In the present method embodiment, the UE respectively estimates the channel quality of the channels between the UE and all coordinated cells in the CATS, and matches the corresponding CQI value set {CQI-1, CQI-2, ..., CQI-K}, K denotes the number of transmission nodes in the CATS and CQI-1 denotes the CQI between the primary serving cell and the UE.

Each CQI value in each CQI-i in the set {CQI-1, CQI-2, ..., CQI-K} is differentiated respectively with the CQI based on the full bandwidth of the primary serving cell to acquire the differential CQI value level in the differential feedback.

The feedback of the primary serving cell uses the method defined in the 3GPP LTE 36.213 to feed back, and the other non-primary serving cells feed back the differential result.

Figure 4:
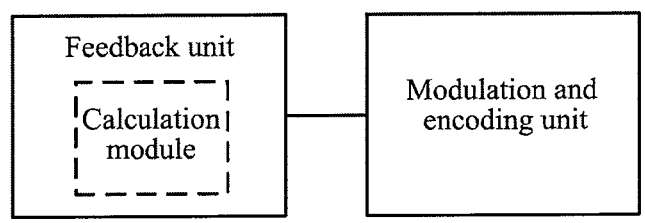
FIG. 4 is a structural schematic diagram of a composition of a system in accordance with the present invention.

FIG. 4 shows a system of CQI feedback, and the system comprises a feedback unit and a modulation and encoding unit. Wherein, the feedback unit is used in the CoMP system, and for the UE feeding back the CQI corresponding to the comprehensive channel formed between all the transmission nodes in the CATS and the UE, or each CQI corresponding to the channel between each transmission node itself and the UE; the modulation and encoding unit is used to modulate and encode the content fed back by the UE. The feedback unit further comprises a calculation module, which is used to calculate the CQI corresponding to the comprehensive channel or each CQI corresponding to the channel between each transmission node itself and the UE according to different design methods of measurement pilot or transmission method.

Here, the feedback unit is further used to feed back by the UE the CQI corresponding to the channel between the primary node and the UE to the primary node; feed back by the UE the CQI corresponding to the comprehensive channel to the primary node, or respectively feed back by the UE each CQI of the channel formed between each non-primary node itself in the CATS except the primary node and the UE to the primary node.

Here, the feedback unit is further used to feed back according to different feedback methods, and the feedback methods comprise: full bandwidth feedback, feedback of the high level configuring sub-bands or feedback of the terminal selecting sub-bands.

The modulation and encoding unit is further used to: corresponding to different feedback methods including the full bandwidth feedback, the feedback of the high level configuring the sub-bands or the feedback of the terminal selecting the sub-bands, perform resource scheduling by the primary node according to the CQI based on the full bandwidth or different sub-bands and fed back by the UE, and select a matching modulation and encoding method to modulate and encode.

Here, the feedback unit is further used for periodic feedback or aperiodic feedback; when the periodic feedback and the aperiodic feedback happen in the same sub-frame, the UE reports the aperiodic feedback in the sub-frame.

The above description is only the preferred embodiments of the present invention, but is not intended to limit the scope of the present invention.

What is claimed is:

1. A method of channel quality indicator feedback, comprising: in a multi-point coordinated transmission and reception (CoMP) system, a terminal feeding back a channel quality indicator corresponding to a comprehensive channel formed between the terminal and all transmission nodes in a CoMP active transmission point set, or each channel quality indicator corresponding to each channel between each transmission node and the terminal;
further comprising: in the CoMP active transmission point set, different transmission nodes applying the same modulation and encoding method.

2. The method of claim 1, wherein, the type of the transmission node comprises a primary node; and said feedback further comprises:
the terminal feeding back a channel quality indicator corresponding to a channel between the primary node and the terminal to the primary node; and
the terminal feeding back the channel quality indicator corresponding to the comprehensive channel to the primary node, or the terminal feeding back to the primary node each channel quality indicator of each channel between the terminal and each non-primary node except the primary node in the CoMP active transmission point set.

3. The method of claim 2, wherein, the level of each channel quality indicator is different from or the same as the level of the channel quality indicator corresponding to the comprehensive channel.

4. The method of claim 3, wherein, the feedback further comprises: the terminal feeding back according to different feedback methods;
wherein, the feedback methods comprise: full bandwidth feedback, feedback of high level configuring sub-bands or feedback of the terminal selecting sub-bands; and
after the feedback, the method further comprises a determining process of modulation and encoding, and the determining process of the modulation and encoding comprises: corresponding to the different feedback methods, the primary node performing resource scheduling according to the channel quality indicator based on the full bandwidth or different sub-band and fed back by the terminal, and selecting a matching modulation and encoding method to modulate and encode data of scheduled users.

5. The method of claim 4, wherein, when the feedback method is the feedback of the high level configuring the sub-bands, or the feedback of the terminal selecting the sub-bands, the feedback further is: the terminal applying a differential mode to feed back; and
wherein, the differential mode is: differentiating the channel quality indicator based on the different sub-band with the channel quality indicator based on the full bandwidth.

6. The method of claim 3, wherein, the feedback comprises: periodic feedback or aperiodic feedback; and
when the periodic feedback and aperiodic feedback happen in a same sub-frame, said terminal reports the aperiodic feedback in said sub-frame.

7. The method of claim 2, wherein, the feedback further comprises: the terminal feeding back according to different feedback methods;
wherein, the feedback methods comprise: full bandwidth feedback, feedback of high level configuring sub-bands or feedback of the terminal selecting sub-bands; and
after the feedback, the method further comprises a determining process of modulation and encoding, and the determining process of the modulation and encoding comprises: corresponding to the different feedback methods, the primary node performing resource scheduling according to the channel quality indicator based on the full bandwidth or different sub-band and fed back by the terminal, and selecting a matching modulation and encoding method to modulate and encode data of scheduled users.

8. The method of claim 7, wherein, when the feedback method is the feedback of the high level configuring the sub-bands, or the feedback of the terminal selecting the sub-bands, the feedback further is: the terminal applying a differential mode to feed back; and
wherein, the differential mode is: differentiating the channel quality indicator based on the different sub-band with the channel quality indicator based on the full bandwidth.

9. The method of claim 2, wherein, the feedback comprises: periodic feedback or aperiodic feedback; and
when the periodic feedback and aperiodic feedback happen in a same sub-frame, said terminal reports the aperiodic feedback in said sub-frame.

10. The method of claim 1, wherein, the feedback further comprises:
the terminal feeding back according to different feedback methods;
wherein, the feedback methods comprise: full bandwidth feedback, feedback of high level configuring sub-bands or feedback of the terminal selecting sub-bands; and
after the feedback, the method further comprises a determining process of modulation and encoding, and the determining process of the modulation and encoding comprises: corresponding to the different feedback methods, the primary node performing resource scheduling according to the channel quality indicator based on the full bandwidth or different sub-band and fed back by the terminal, and selecting a matching modulation and encoding method to modulate and encode data of scheduled users.

11. The method of claim 10, wherein, when the feedback method is the feedback of the high level configuring the sub-bands, or the feedback of the terminal selecting the sub-bands, the feedback further is: the terminal applying a differential mode to feed back; and wherein, the differential mode is: differentiating the channel quality indicator based on the different sub-band with the channel quality indicator based on the full bandwidth.

12. The method of claim 1, wherein, the feedback comprises: periodic feedback or aperiodic feedback; and when the periodic feedback and aperiodic feedback happen in a same sub-frame, said terminal reports the aperiodic feedback in said sub-frame.

13. A system of channel quality indicator feedback, comprising a feedback unit at a terminal side, and a modulation and encoding determination unit at a primary node side; wherein, said feedback unit is used in a multi-point coordinated transmission and reception (CoMP) system to calculate and feed back a channel quality indicator corresponding to a comprehensive channel formed between the terminal and all transmission nodes in a CoMP active transmission point set, or each channel quality indicator corresponding to each channel between each transmission node and the terminal; and said modulation and encoding determination unit is used to determine a modulation and encoding method corresponding to downlink data transmission according to content fed back by the terminal;

wherein, in the CoMP active transmission point set, different transmission nodes apply the same modulation and encoding method.

14. The system of claim 13, wherein, the feedback unit is further used to feed back a channel quality indicator corresponding to a channel between the primary node and the terminal to the primary node; and feed back the channel quality indicator corresponding to the comprehensive channel to the primary node, or respectively feed back to the primary node each channel quality indicator of each channel formed between each non-primary node except the primary node in the CoMP active transmission point set and the terminal.

15. The system of claim 13, wherein, the feedback unit is further used to feed back according to different feedback methods; and wherein, said feedback methods comprise: full bandwidth feedback, feedback of high level configuring sub-bands or feedback of the terminal selecting sub-bands.

16. The system of claim 15, wherein, the modulation and encoding unit is further used to, corresponding to the different feedback methods, perform resource scheduling according to the channel quality indicator based on the full bandwidth or different sub-band and fed back by the terminal, and select a matching modulation and encoding method to modulate and encode.

17. The system of claim 13, wherein, the feedback unit is further used to perform periodic feedback or aperiodic feedback; and when the periodic feedback and the aperiodic feedback happen in a same sub-frame, the terminal reports the aperiodic feedback to said sub-frame.

* * * * *